(12) United States Patent
May

(10) Patent No.: US 8,161,481 B2
(45) Date of Patent: Apr. 17, 2012

(54) OPERATING SYSTEM PROVIDING A MUTUAL EXCLUSION MECHANISM

(75) Inventor: Dennis May, London (GB)

(73) Assignee: Nokia Corporation (FI)

( * ) Notice: Subject to any disclaimer, the term of this patent is extended or adjusted under 35 U.S.C. 154(b) by 981 days.

(21) Appl. No.: 10/599,574

(22) PCT Filed: Apr. 1, 2005

(86) PCT No.: PCT/GB2005/001300
§ 371 (c)(1),
(2), (4) Date: May 21, 2007

(87) PCT Pub. No.: WO2005/096149
PCT Pub. Date: Oct. 13, 2005

(65) Prior Publication Data
US 2008/0104600 A1 May 1, 2008

(30) Foreign Application Priority Data
Apr. 2, 2004 (GB) .................................. 0407544.6

(51) Int. Cl.
G06F 9/46 (2006.01)
G06F 7/00 (2006.01)
G06F 12/00 (2006.01)

(52) U.S. Cl. ........ 718/102; 718/100; 718/101; 718/108; 707/704; 710/200

(58) Field of Classification Search .................. None
See application file for complete search history.

(56) References Cited

U.S. PATENT DOCUMENTS

| 5,524,247 | A | | 6/1996 | Mizuno |
|---|---|---|---|---|
| 5,729,710 | A | * | 3/1998 | Magee et al. .................. 711/203 |
| 5,826,081 | A | * | 10/1998 | Zolnowsky ................... 718/103 |
| 6,029,190 | A | | 2/2000 | Oliver |
| 6,223,204 | B1 | | 4/2001 | Tucker |
| 6,272,517 | B1 | * | 8/2001 | Yue et al. ....................... 718/102 |
| 6,934,933 | B2 | * | 8/2005 | Wilkinson et al. ............. 717/121 |
| 7,080,374 | B2 | * | 7/2006 | Dahlstedt et al. ................. 718/1 |
| 7,210,146 | B2 | * | 4/2007 | Hsieh ............................ 718/103 |

(Continued)

FOREIGN PATENT DOCUMENTS
EP 0 661 633 7/1995

(Continued)

OTHER PUBLICATIONS

Hall, John. "Engineering Excellence: DEC OSF/1 Symmetric Multi-Processing". DEC UNIX Software Group, Nashua, NH. Aug. 10, 1994.*

(Continued)

*Primary Examiner* — Emerson Puente
*Assistant Examiner* — Adam Lee
(74) *Attorney, Agent, or Firm* — Alston & Bird LLP

(57) ABSTRACT

An operating system for a computing device includes a scheduler incorporating an algorithm for ordering the running of threads of execution having different priorities. The operating system is also arranged to provide a list of threads which are scheduled to run on the device, ordered by priority. At least one locking mechanism for docking access to a resource of the device from all threads except for a thread that holds the locking mechanism is also provided, and the operating system arranges for a scheduled thread which is docked from running because the resource it requires is locked to cause the thread which holds the locking mechanism to run.

29 Claims, 4 Drawing Sheets

U.S. PATENT DOCUMENTS

| | | | |
|---|---|---|---|
| 7,676,809 B2* | 3/2010 | Vaidyanathan et al. | 718/103 |
| 2003/0018510 A1* | 1/2003 | Sanches | 705/9 |
| 2004/0045003 A1* | 3/2004 | Lake | 718/103 |

FOREIGN PATENT DOCUMENTS

| | | |
|---|---|---|
| EP | 0 783 152 | 7/1997 |
| JP | 5-204675 A | 8/1993 |

OTHER PUBLICATIONS

Welc et al., "Preemption-based avoidance of priority inversion for Java," Proc. of IEEE 2004 Intl. Conf. on Parallel Processing (2004).

Search Report, dated Mar. 31, 2005, issued in corresponding GB Application No. GB0407544.6.

Examination Report, dated Dec. 21, 2006, issued in corresponding GB Application No. GB0407544.6.

Cherepov M. et al: "Hard real-time with RTX on Windows NT" Proceedings of the USENIX Windows NT Symposium, Jul. 13, 1999, pp. 103-111, XP002289600 abstract p. 107.

Liedtke, Jochen; "On μ-Kernel Construction"; 15$^{th}$ ACM Symposium on Operating System Principles; Colorado; Dec. 1995; 58 sheets.

Bomberger, Alan C., et al.; "The KeyKOS® Nanokernel Architecture"; Proceedings of the USENIX Workshop on Micro-Kernels and Other Kernel Architectures; USENIX Association; Apr. 1992; 18 pages.

Durkin, Tom; "The Vx-Files: What the Media Couldn't Tell You About The Mars Pathfinder"; Robot Science & Technology; Copyright 1998; Issue 1; 3 pages.

Rivas, Mario Aldea, et al.; "MaRTE OS: An Ada Kernel for Real-Time Embedded Applications"; Lecture Notes in Computer Science; vol. 2043, Jan. 2001; pp. 305-316.

Sha, Lui, et al.; "Priority Inheritance Protocols: An Approach to Real-Time Synchronization"; IEEE Transactions on Computers; vol. 39; No. 9; Sep. 1990; pp. 1175-1185.

International Search Report and Written Opinion for International Application No. PCT/GB2005/001300, mailed Jul. 26, 2005 (8 sheets).

International Preliminary Report on Patentability for International Application No. PCT/GB2005/001300, mailed Apr. 26, 2006 (6 sheets).

Office Action for Japanese Application No. 2007-505640 dated Apr. 12, 2011.

Cherepov, M. et al., *Hard Real-Time With RTX on Windows NT*, Paper—Proceedings of the 3$^{rd}$ USENIX Windows NT Symposium, Seattle, WA, (1999), 10 pages.

Office Action for Japanese Application No. 2007-505640 dated Oct. 31, 2011.

* cited by examiner

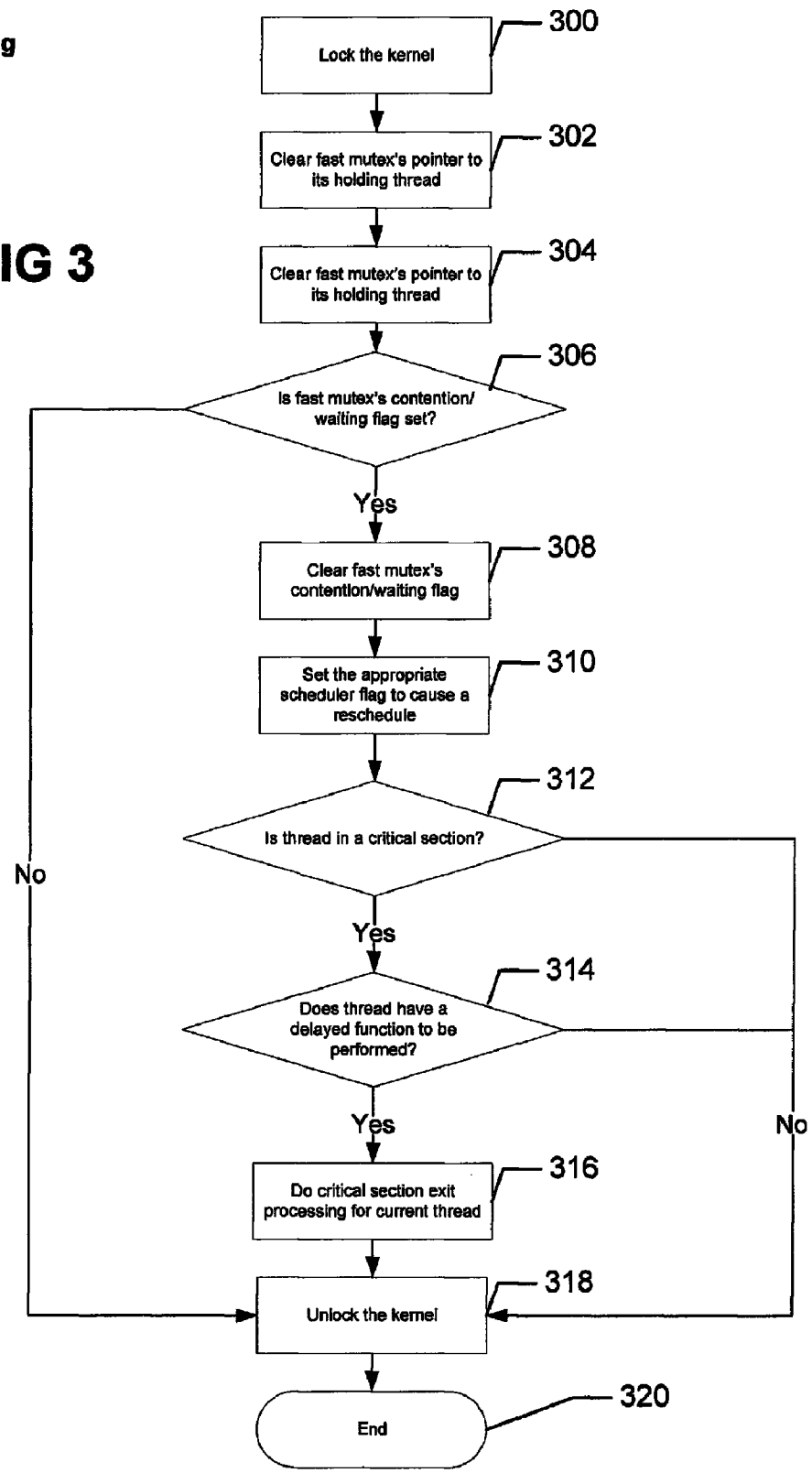

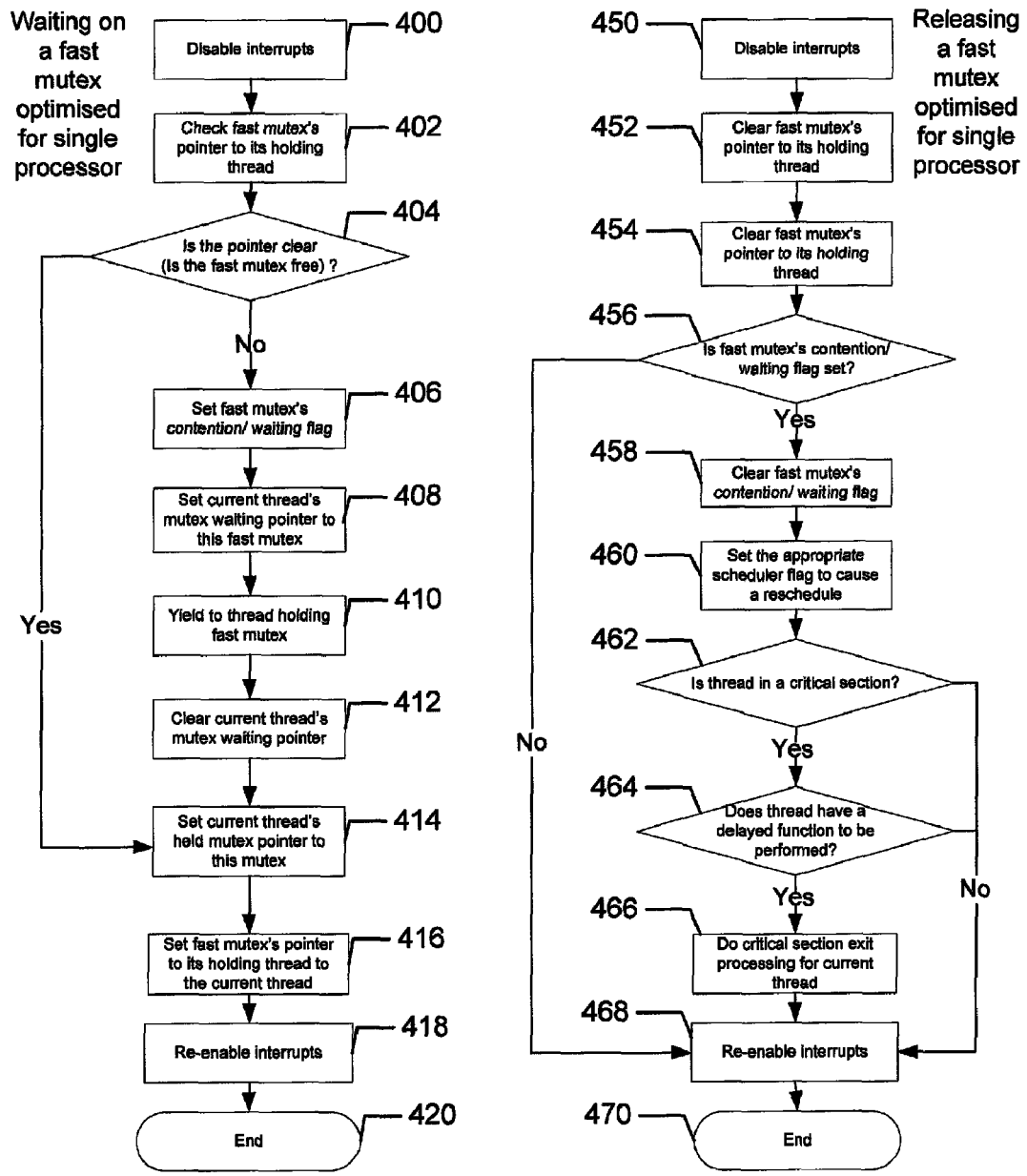

OPERATING SYSTEM PROVIDING A MUTUAL EXCLUSION MECHANISM

CROSS REFERENCE TO RELATED APPLICATIONS

This application claims the priority of PCT/GB2005/001300 filed on Apr. 1, 2005, and, GB 0407544.6 filed on Apr. 2, 2004, the entire contents of which are hereby incorporated in total by reference.

TECHNOLOGICAL FIELD

The present invention relates to an operating system for a computing device, and in particular to a method of providing a mutual exclusion mechanism for the operating system kernel of a computing device which offers significant advantages for reliability and performance.

BACKGROUND

The term computing device as used herein is to be expansively construed to cover any form of electrical device and includes, data recording devices, such as digital still and movie cameras of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

Most computing devices are programmed to operate under the control of an operating system (OS). The operating system controls the computing device by way of a series of instructions, in the form of code, fed to a central processing unit of the computing device. These instructions can be regarded as a series of quasi-autonomous fundamental units of execution which are scheduled by the operating system. These fundamental units of execution are, respectively, known as threads and a process to be carried out in the computing device will invariably include one or more threads. A typical operating system will schedule many different threads in order to control the wide variety of tasks to be carried out by the computing device.

The operating system can be regarded as being made up of a number of components and some of these components have a more privileged access to the hardware resources of the computing device than other components. The components having more privileged access are known as privileged components. One or more of these privileged components form what is commonly known as the kernel of the operating system.

OS kernels typically provide those core services on which all the other portions of the operating system itself, together with all applications running on the platform, have to depend. Ideas concerning what constitutes those core services have been changing over time, and the consequent effects on the overall design of operating systems constitute the background to this invention.

However, it is generally acknowledged that there are two fundamental approaches to OS design, and these are frequently referred to as the 'monolithic kernel' approach and the 'microkernel' approach.

Monolithic kernels are large blocks of code which contain a relatively large proportion of the entire operating system running at the highest privilege level available. This normally includes all of the interfaces with the computing hardware.

Modern monolithic kernels have introduced substantial modularity to the design of the kernel, with formal interface layers and run-time loadable kernel modules mitigating the problems of portability, upgradeability and memory usage traditionally associated with such designs. However, the key feature of a very large block of code with substantial functionality running at high privilege level (in what is known as kernel mode) is retained in all the main commercial operating systems which are based on monolithic kernels, including Windows™ from Microsoft and most versions of Linux.

In contrast, the microkernel approach is significantly different to that of the monolithic kernel. The operating services provided are minimised, and typically reduced to ensuring the integrity of processes and address spaces, together with scheduling, synchronization, and interprocess communications. All other operating system services, often including memory management, are provided as loadable modules. But, the critical difference from the monolithic kernel approach is that these other services are not loaded into the kernel memory space and then run in kernel mode, but are instead implemented as servers which are loaded into their own individual memory spaces and run at a lesser privilege level, in what is known as user mode.

FIG. 1 illustrates the key difference between the two architectural paradigms described above. In this regard, FIG. 1 illustrates an example layered monolithic kernel design 102 and an example microkernel design 104, in which the key difference between the two architectural paradigms may be seen.

While early microkernel based operating systems tended to be academic (for instance, the Mach kernel developed at Carnegie-Mellon University), the minimalism and the consequent predictability of microkernel designs have, since the mid-1990s, made them standard for real-time and embedded operating systems. Wind River, QNX, OSE and Mentor Graphics all utilise elements of microkernel designs in their real-time operating systems (RTOSs). More recently, the Mach kernel itself has been integrated into the open-source Darwin XNU kernel which lies at the foundation of Apple's Mac OS X, and Mach is also the basis for the Hurd kernel which the Gnu project have developed as a replacement for standard monolithic Unix/Linux kernels.

As well as their deterministic characteristics, microkernel architectures can also bring advantages in flexibility, extensibility, security and reliability over monolithic kernels.

However, there are also disadvantages. Since a microkernel has to mediate all communication between user mode processes which in a monolithic kernel would have shared the same address space and been able to call directly into each others application program interfaces (APIs), there is a greater frequency of context switching. Depending on the hardware and the memory architecture of the host system, this can result in poorer performance when compared to monolithic kernels.

It is possible to extend the techniques used in developing microkernel designs to the lowest level of the microkernels themselves. This has in fact been done, and is the basis of so-called nanokernel architectures. Arguably, a nanokernel doesn't represent a new departure in OS design methodology, as it is nothing more than a highly minimalist microkernel. Indeed, much of the academic literature on minimising microkernels is highly applicable to nanokernel design. See, for example, section 2 of the article "On μ-Kernel Construction" by Jochen Liedtke, Proceedings of 15th ACM Symposium on Operating System Principles, December 1995.

However, the more primitive the microkernel becomes, the less its role as an integral part of an operating system. This is because it becomes possible to run a variety of discrete operating system personalities, which can all be implemented above the nanokernel. The potential for this development was recognised early on in microkernel development. For an example, see "The KeyKOS Nanokernel Architecture" by Bomberger et al, Proceedings of the USENIX Workshop on Micro-Kernels and Other Kernel Architectures, USENIX Association, April 1992, which describes a nanokernel whose requirements included the ability to run multiple instantiations of several operating systems on a single hardware system.

This possibility is not just theoretical; a version of Jochen Liedtke's L4 microkernel is able to run Linux alongside other tasks. For example, a microkernel with real-time capabilities running on the x86 and ARM platforms, known as Fiasco and which is compatible with the L4 microkernel, has been demonstrated to run L4Linux, a port of the Linux kernel to the L4 interface which executes completely in user mode, with a DOpE real-time windowing environment running on top of the microkernel, with an instance of L4Linux running in one of the windows.

There are, however, deficiencies with the current technology. The fact that microkernels underpin the entire operating system makes a robust and efficient design highly important. In particular, the microkernel's role in scheduling processes and tasks is critically important for the functioning of the operating system as a whole; it simply cannot be allowed to fail. Such scheduling is not trivial, particularly where a real-time operating system (RTOS) is concerned. RTOSs have to be able to make firm guarantees about response times to particular events. One of the key mechanisms enabling an RTOS to make such guarantees is a priority mechanism which ranks particular tasks in order of real-time criticality, and schedules the most important tasks ahead of less important ones.

A well-known problem with priority mechanisms in multi-tasking operating systems is the phenomenon of priority inversion, where a low-priority task holds a lock (known as a mutual exclusion object, or mutex) on a resource which is needed by a high-priority task. Unless steps are taken to anticipate this situation, the task scheduling algorithm will always try to run the higher priority task ahead of the lower priority one, with the result that the resource lock never gets released, and the higher priority task therefore becomes blocked.

The solution to the problem of priority inversion is priority inheritance, which means that the priority of a task that has a lock on a resource is always boosted to a level at or above that of the highest priority task waiting on that resource. However, traditional methods of priority inheritance can be computationally expensive to implement, and consequently force the operating system designer to trade off robustness against performance.

In at least one well-known case, the 1997 Mars Pathfinder mission, the decision was made on performance grounds not to use priority inheritance. In "What the Media Couldn't Tell You About MarsPathfinder" Robot Science & Technology Issue 1, 1998, Tom Durkin writes:

"In order to prevent communications conflicts, VxWorks synchronized access to the bus with mutual exclusion software locks. However, very infrequently, an interrupt was sent to the bus that caused a medium-priority communications task to be scheduled during the split-second interval when a high-priority thread was blocked while waiting for a low-priority meteorological data thread to run . . . the long-running, medium-priority communications task—having a higher priority than the low-priority meteorological task—would prevent the meteorological task from running . . . this scenario is a classic case of priority inversion. Wind River had deliberately turned off the priority inheritance option before launch to optimize the performance of VxWorks" A deficiency of many current microkernel designs is that they feature separate and computationally expensive priority inheritance mechanisms. Hence, turning them off to boost operating system performance is always going to be a temptation. An architecture which provides automatic priority inheritance without any performance penalty is therefore preferable to existing designs, since it would not force robustness and performance to be traded off against each other. This is especially true where the nanokernel is used to host one or more operating systems, since any unreliability in the nanokernel translates directly into unreliability in the operating system as a whole.

BRIEF SUMMARY

It is therefore an object of the present invention to provide an improved form of computing device which is able to display automatic priority inheritance without any performance penalty.

According to a first aspect of the present invention there is provided a computing device comprising a scheduler incorporating an algorithm for ordering the running of threads of execution having different priorities; and including a list of threads which are scheduled to run on the device, ordered by priority; the device further comprising at least one locking mechanism for blocking access to a resource of the device from all threads except for a thread that holds the locking mechanism; and in which a scheduled thread which is blocked from running causes the thread which holds the locking mechanism to run.

According to a second aspect of the invention there is provided a method of operating a computing device, the method comprising providing a scheduler incorporating an algorithm for ordering the running of threads of execution having different priorities, and including a list of threads which are scheduled to run on the device, ordered by priority; providing at least one locking mechanism for blocking access to a resource of the device from all threads except for a thread that holds the locking mechanism; and arranging for a scheduled thread which is blocked from running to cause the thread which holds the locking mechanism to run.

According to a third aspect of the present invention there is provided an operating system for a computing device, the operating system comprising a scheduler incorporating an algorithm for ordering the running of threads of execution having different priorities, and including means for providing a list of threads which are scheduled to run on the device, ordered by priority; at least one locking mechanism for blocking access to a resource of the device from all threads except for a thread that holds the locking mechanism; and means for arranging for a scheduled thread which is blocked from running to cause the thread which holds the locking mechanism to run.

DESCRIPTION OF THE DRAWINGS

An embodiment of the present invention will now be described, by way of further example only, with reference to the accompanying drawings in which:

FIG. 3 illustrates a procedure for releasing a fast mutex in accordance with an embodiment of the present invention; and FIG. 4 illustrates a procedure for optimising both waiting for and releasing a fast mutex in a single processor (non-SMP) system.

DETAILED DESCRIPTION

An embodiment of the present invention will now be described, by way of further example only, with reference to the accompanying drawing which illustrates examples of monolithic and micro kernel architectures.

The present invention will be described with specific reference to the Symbian OS™ operating system available from Symbian Limited of London, England. However, it is to be understood that the principles of the present invention may also be used to equal advantage in other types of operating system.

The Symbian OS operating system includes a pre-emptive multi-threaded nanokernel style layer providing hard real-time support. It is within this nanokernel that an implementation of a single mechanism which is referred to as a fast mutex is to be found. This combines the benefits of a method for kernel threads to provide mutual exclusion locks on resources with the benefits of a method for automatic priority inheritance for the task holding the mutex. The multi-threaded nature of the kernel makes it suitable for use in either single-processor or symmetrical multiprocessing (SMP) systems, and the fast mutex can be used in either configuration.

Figure 1:
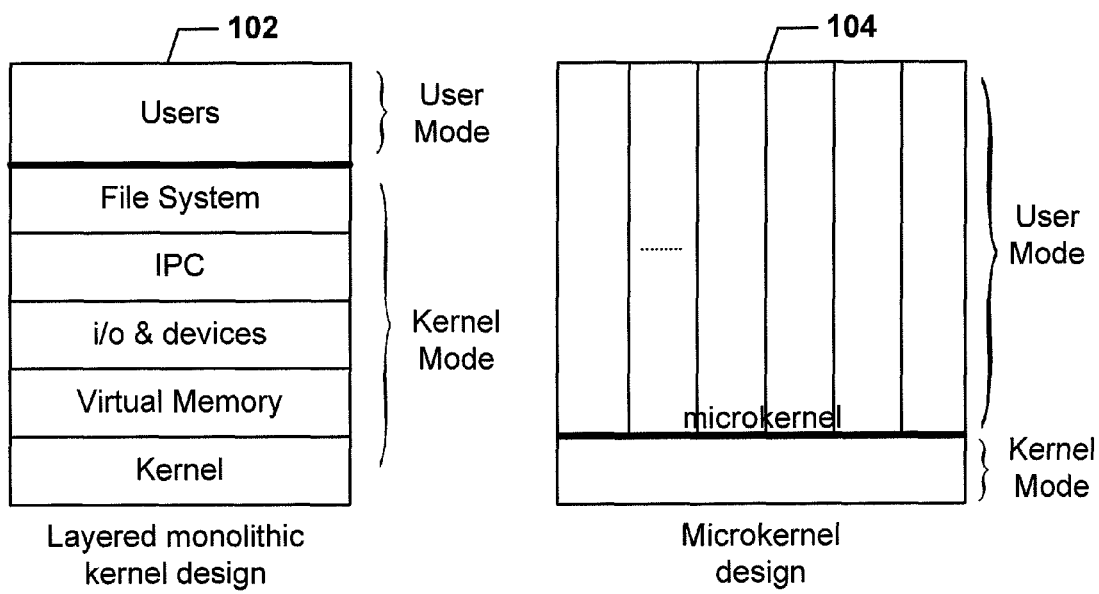
FIG. 1 illustrates examples of monolithic and micro kernel architectures.

It is not considered necessary to fully describe the Symbian OS operating system in order to provide a sufficient understanding of this invention. Thus, the following description is restricted to those parts of the operating system relevant to the invention. The Symbian OS kernel is a hybrid between the monolithic 102 and microkernel 104 approaches shown in FIG. 1, and therefore combines certain advantages of both. The concept of a kernel which implements a message-passing framework for the benefit of user-side servers is derived from micro-kernel architectures; its networking and telephony stacks, as well as the file system, are all user-side servers. On the other hand, the implementation of device drivers as loadable kernel modules derives from monolithic kernel architectures.

The nanokernel itself is largely agnostic about managing memory. Like many other microkernel and nanokernel architectures, it delegates this task to an external module. This is referred to as the memory model. The kernel provides a hook to allow the memory model to perform address space switching on reschedule.

A variety of memory models have been implemented in the Symbian OS operating system. Two of these in particular are worth noting:

The moving memory model uses a single page directory, with entries in the directory moved around on each inter-process context switch. This can be a relatively lengthy operation, and consequently the memory hook function of the nanokernel runs with preemption enabled in this model, which prevents process switching from adversely affecting thread latency.

In the multiple memory model each process has its own page directory, and context switching changes the page directory base register. In this model, address space changes are fast because they involve only a change of page directory. Therefore, the memory hook function of the nanokernel runs with preemption disabled to improve efficiency and simplify code The nanokernel is multi-threaded, and one of its main functions is to share the available central processor unit (CPU) resources among several threads. Nanokernel threads are similar to threads as found on most other RTOSs and their essential characteristic is that each one has its own stack together with an integer priority between 0 and 63 inclusive. Threads can be in a number of different states; all threads in the READY state are eligible for execution and are linked into what is referred to as the ready list. Threads are usually scheduled on the basis of priority, and a scheduler within the operating system ensures that the highest priority thread on the ready list will run.

The ready list is always accessed with the kernel locked, so in order to maintain a low thread latency it is required that all operations on the ready list be bounded and as fast as possible. This is achieved by using 64 separate queues, one for each possible thread priority, which explains the restriction to 64 thread priorities. Each thread on the ready list is placed in the queue corresponding to its priority. A 64-bit mask is also maintained to indicate which queues are non-empty; bit n in the mask is set if and only if the queue for priority n is non-empty.

To insert an entry in the ready list, all that is necessary is to add it to the tail of the queue corresponding to its priority (no searching required), and set the corresponding bit in the bit mask. To remove an entry, firstly the link from its queue is opened, then if that queue is empty, the respective bit in the bit mask is reset. To find the highest priority entry, the most significant 1 in the bit mask is found (which can be done with a binary search or by a single instruction on some CPUs), and then the first entry on the corresponding queue is found.

This implementation thus yields bounded (and small) execution times for insertion and removal of entries and for finding the highest priority entry. To save on memory, a single pointer is used for each queue. This is NULL if the queue is empty, otherwise it points to the first entry on the queue. The entries on the queue are arranged in a doubly-linked ring.

The nanokernel maintains a flag (iRescheduleNeededFlag) which indicates whether a thread switch may be required. This flag is set whenever a thread is added to the ready list whose priority is greater than or equal to the highest priority of any other thread already on the list or, in the equality case, when the first thread at the same priority has used its timeslice (each thread has a specifies timeslice). This flag is also set by a nanokernel timer tick interrupt when the current thread's timeslice has expired. When the kernel is subsequently unlocked this flag is checked to determine whether a reschedule is needed. The flag is cleared when a reschedule actually occurs.

Each thread has a specified timeslice (iTimeslice) and time count (iTime). Each time the thread blocks or is rotated to the end of the queue of threads at the same priority, the iTime field is set equal to iTimeslice. The low level tick interrupt decrements the current thread's iTime if it is positive and triggers a reschedule if it becomes zero. Thus if iTimeslice is positive the thread will run for iTimeslice low level timer ticks before yielding to the next thread at the same priority. If iTimeslice is negative the thread will only yield to other threads at the same priority if it blocks.

Each thread has a critical section count (iCsCount) which is incremented every time the thread enters a critical section of kernel code during which it may not be suspended or killed. A thread trying to suspend or kill another thread must first check the target thread's critical section count. If the count is zero, the thread may be immediately suspended or killed. If the count is not zero, another flag is set (iCsFunction) to indicate whether the thread should suspend or exit when it leaves the critical section. When a thread leaves a critical section of kernel code, its iCsCount is decremented and, if it becomes zero, the iCsFunction is checked and the thread suspends itself or exits as necessary. The thread which called Suspend( ) or Kill( ) of the other thread is not blocked at any stage—it simply carries on executing.

Fast mutexes are provided as the fundamental means to allow mutual exclusion between nanokernel threads. They have the following properties:
  Very fast in the case where there is no contention for the lock.
  Low RAM footprint.
  A thread may not wait on a fast mutex if it already holds any fast mutex (they are non-nestable).
  A thread may neither exit nor wait for an object implemented in a layer outside the nanokernel while holding a fast mutex.

In the present invention, the thread critical section system described above is extended to ensure that a thread is not terminated while holding a fast mutex; a thread holding a fast mutex is treated as being in a critical section, so external suspension and termination of the thread are deferred until the thread releases the fast mutex. This leaves the case where the thread attempts to exit itself while holding a fast mutex, for example as a result of taking an exception; as with a thread attempting to exit while in a critical section, this will fault the kernel.

Holding a fast mutex also prevents a thread from being timesliced with threads at the same priority; this is done to reduce time spent unnecessarily switching between threads in short critical sections. Fast mutexes are essentially designed to efficiently protect short critical sections of code.

A fast mutex consists of a pointer to the holding thread (iHoldingThread, which is NULL if the mutex is free) and a flag (iWaiting) which indicates either that contention for the mutex has occurred or that an action has been deferred because the mutex was held, for example suspension, termination or round-robin of the holding thread. In addition, each nanokernel thread has a pointer to the fast mutex currently held by the thread (iHeldFastMutex, NULL if none is held), of which there can be at most one since fast mutexes do not nest. Each nanokernel thread also has a pointer to the fast mutex on which it is currently blocked (iWaitFastMutex, NULL if none).

The algorithm for waiting on a fast mutex may be:

```
Lock the kernel
IF (iHoldingThread!=NULL)
    iWaiting = TRUE
    Current thread -> iWaitFastMutex = this
    Yield to iHoldingThread
    Lock the kernel
    Reenable interrupts
    Current thread -> iWaitFastMutex = NULL
ENDIF
Current thread -> iHeldFastMutex = this
iHoldingThread = Current thread
Unlock the kernel
```

Figure 2:
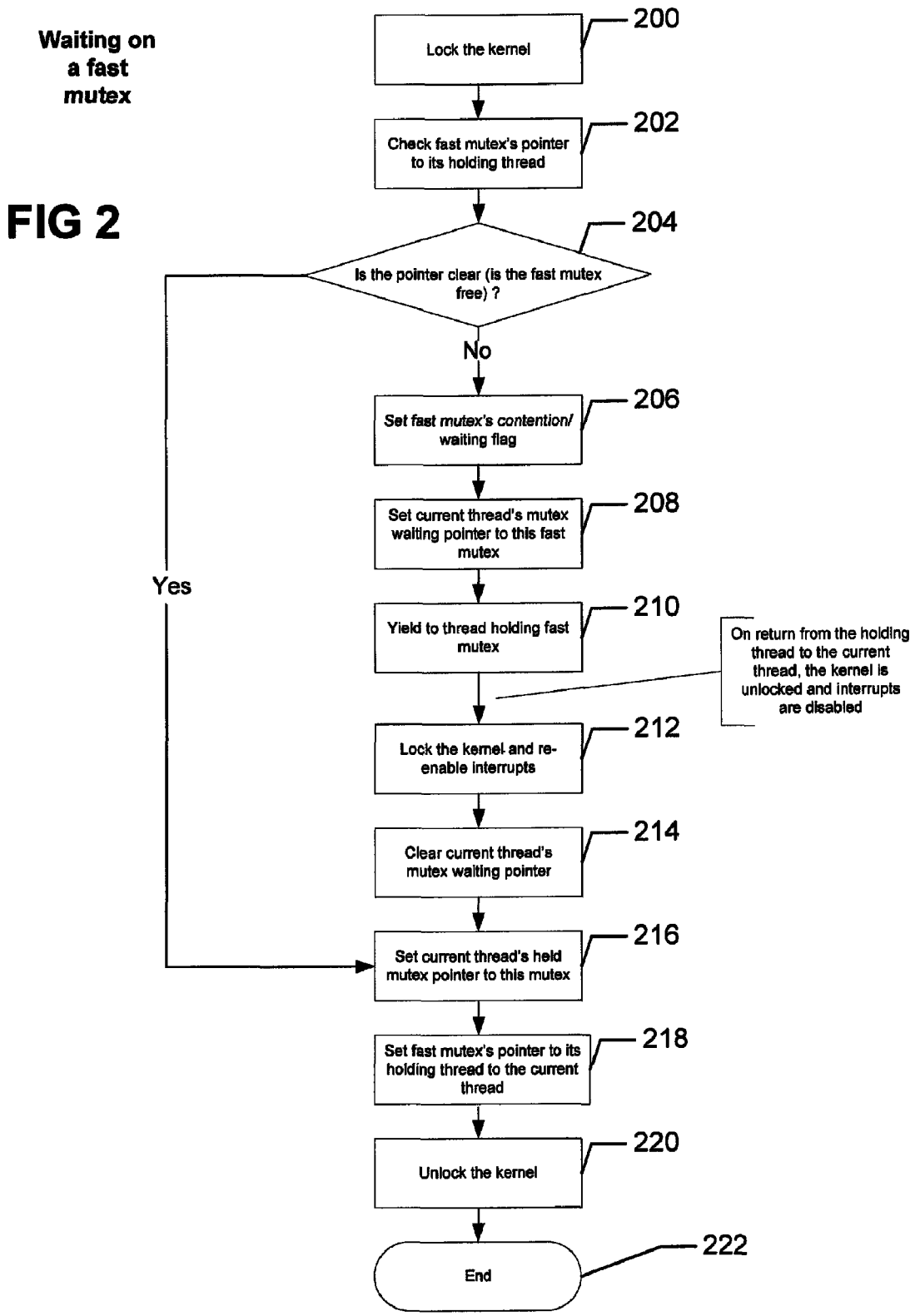
FIG. 2 illustrates a procedure for waiting on a fast mutex in accordance with an embodiment of the present invention.

This procedure is shown in FIG. 2. In this regard, as illustrated in FIG. 2, operation 200 may comprise locking the kernel. Operation 202 may comprise checking the fast mutex's pointer to its holding thread. Operation 204 may comprise determining whether the pointer is clear (e.g., whether the fast mutex is free). If the pointer is clear, the procedure may skip to operation 216 (described below). If, however, the pointer is not clear, the procedure may proceed to operation 206. Operation 206 may comprise setting the fast mutex's contention/waiting flag. Operation 208 may comprise setting the current thread's mutex waiting pointer to this fast mutex. Operation 210 may comprise yielding to thread holding the fast mutex. On return from the holding thread to the current thread, the kernel is unlocked and interrupts are disabled. Operation 212 may comprise locking the kernel and re-enabling interrupts. Operation 214 may comprise clearing the current thread's mutex waiting pointer. Operation 216 may comprise setting the current thread's held mutex pointer to this mutex. Operation 218 may comprise setting the fast mutex's pointer to its holding thread to the current thread. Operation 220 may comprise unlocking the kernel. Operation 222 may comprise the end of the procedure.

In the case where there is no contention, this simply reduces to two variable assignments. On non-SMP (symmetrical processing) systems this can be and has been further optimised by simply disabling interrupts rather than locking the kernel while checking iHoldingThread. This procedure is shown in FIG. 4.

In this regard, as illustrated in FIG. 4, operation 400 may comprise locking disabling interrupts. Operation 402 may comprise checking the fast mutex's pointer to its holding thread. Operation 404 may comprise determining whether the pointer is clear (e.g., whether the fast mutex is free). If the pointer is clear, the procedure may skip to operation 414 (described below). If, however, the pointer is not clear, the procedure may proceed to operation 406. Operation 406 may comprise setting the fast mutex's contention/waiting flag. Operation 408 may comprise setting the current thread's mutex waiting pointer to this fast mutex. Operation 410 may comprise yielding to thread holding the fast mutex. Operation 412 may comprise clearing the current thread's mutex waiting pointer. Operation 414 may comprise setting the current thread's held mutex pointer to this mutex. Operation 416 may comprise setting the fast mutex's pointer to its holding thread to the current thread. Operation 418 may comprise re-enabling interrupts. Operation 420 may comprise the end of the procedure.

The invention provides automatic priority inheritance. This means that threads which are blocked on the fast mutex are not removed from the ready list. This is in clear distinction to other operating system and scheduling algorithms that always remove such threads from the ready list and queue them in a separate blocked list. (There is such a blocked state in the Symbian OS nanokernel, but it is only used for threads that are blocked on a wait object implemented in an OS layer above the nanokernel.)

Instead of being removed from the ready list, threads that are blocked on a fast mutex execute the Yield to iHoldingThread operation. This performs a direct context switch from the current thread to the mutex holding thread. It does not remove any thread from the ready list, nor does it perform any long-running memory management unit (MMU) page table manipulations; that is, when used in conjunction with the moving memory model it doesn't call the nanokernel hook provided to allow (slow) process context switches, in order to reduce the overhead incurred by blocking a thread on a fast mutex. However, the operation does perform the address space change on the multiple memory model, since this is very fast.

This means that user address space is not guaranteed to be consistent while the current thread holds a fast mutex. The only exception to this is when the fast mutex held is the system lock, which is used in the moving memory model to ensure that the memory hook function doesn't become nested. Note that the YieldTo returns with interrupts disabled and the kernel unlocked, as does the scheduler itself, as described below. Note also that the scheduling algorithm ensures that YieldTo will not return until the mutex has been released.

Not removing threads from the ready list and instead immediately yielding to the mutex holding thread, effectively provides priority inheritance. This comes about because a thread blocked on the fast mutex remains on the ready list, so a reschedule can only be triggered if another thread becomes ready whose priority is at least as great as the highest priority blocked thread. Hence, the holding thread effectively has its priority raised to that of the highest priority blocked thread.

A typical algorithm for releasing a fast mutex is:

```
Lock the kernel
iHoldingThread = NULL
Current thread -> iHeldFastMutex = NULL
IF iWaiting
    iWaiting = FALSE
    Set TheScheduler.iRescheduleNeededFlag to cause reschedule
    IF CurrentThread->iCsFunction && CurrentThread->iCsCount==0
        Do critical section exit processing for current thread
    ENDIF
ENDIF
Unlock the kernel
```

This procedure is shown in FIG. 3. In this regard, as illustrated in FIG. 3, operation 300 may comprise locking the kernel. Operation 302 may comprise clearing the fast mutex's pointer to its holding thread. Operation 304 may comprise clearing the fast mutex's pointer to its holding thread. Operation 306 may comprise determining whether the fast mutex's contention/waiting flag is set. If the flag is not set, the procedure may skip to operation 318 described below). If, however, the flag is set, the procedure may proceed to operation 308. Operation 308 may comprise clearing the fast mutex's contention/waiting flag. Operation 310 may comprise setting the appropriate scheduler flag to cause a reschedule. Operation 312 may comprise determining whether the thread is in a critical section. If the thread is not in a critical section, the procedure may skip to operation 318 (described below). If, however, the thread is in a critical section, the procedure may proceed to operation 314. Operation 314 may comprise determining whether the thread has a delayed function to be performed. If the thread does not have a delayed function to be performed, the procedure may skip to operation 318 (described below). If, however, the thread does have a delayed function to be performed, the procedure may proceed to operation 316. Operation 316 may comprise performing critical section exit processing for the current thread. Operation 318 may comprise unlocking the kernel. Operation 320 may comprise the end of the procedure.

In the case where there is no contention, this simply reduces to two variable assignments. Again, on non-SMP systems this can be and has been further optimised by disabling interrupts rather than locking the kernel while checking the iWaiting flag. This optimization is shown in FIG. 4. The iWaiting flag will have been set if another thread had attempted to acquire the mutex while the current thread held it. It will also have been set if the thread's timeslice has expired (the round-robin with other equal priority threads is deferred until the fast mutex is released) or if an attempt was made to suspend or kill the thread. The latter scenario is handled in a similar way to the case where the thread was executing in a thread critical section (ie iCsCount nonzero). The deferred operation is processed when the fast mutex is released, hence the check of iCsCount and iCsFunction in the mutex release code.

Referring again to FIG. 4, operation 450 may comprise disabling interrupts. Operation 452 may comprise clearing the fast mutex's pointer to its holding thread. Operation 454 may comprise clearing the fast mutex's pointer to its holding thread. Operation 456 may comprise determining whether the fast mutex's contention/waiting flag is set. If the flag is not set, the procedure may skip to operation 468 (described below). If, however, the flag is set, the procedure may proceed to operation 458. Operation 458 may comprise clearing the fast mutex's contention/waiting flag. Operation 460 may comprise setting the appropriate scheduler flag to cause a reschedule. Operation 462 may comprise determining whether the thread is in a critical section. If the thread is not in a critical section, the procedure may skip to operation 468 (described below). If, however, the thread is in a critical section, the procedure may proceed to operation 464. Operation 464 may comprise determining whether the thread has a delayed function to be performed. If the thread does not have a delayed function to be performed, the procedure may skip to operation 468 (described below). If, however, the thread does have a delayed function to be performed, the procedure may proceed to operation 466. Operation 466 may comprise performing critical section exit processing for the current thread. Operation 468 may comprise re-enabling interrupts. Operation 470 may comprise the end of the procedure.

The nanokernel includes a scheduler, and this is called at the end of an interrupt service routine (ISR) if there are pending actions queued by an ISR or pending reschedules, provided that the kernel is not locked. It is also called whenever the kernel is unlocked and the same conditions regarding pending actions and reschedules apply.

The scheduler first checks to see if there are pending actions queued by an ISR; it then selects the highest priority thread ready to run. Threads of the same priority are scheduled on a round-robin basis, as described above. The nanokernel scheduler specifically deals with the case where the selected thread holds a fast mutex as follows:

If the mutex held is the system lock the scheduler can simply switch straight to the thread with no further checking, since the address space cannot have been changed since the thread last ran. Also, the selected thread cannot be blocked on a fast mutex (because it holds one and they do not nest).

If the selected thread holds a fast mutex other than the system lock the scheduler can still switch to it, and it is unnecessary to hook out to carry out address space changes since the user-mode address space is not guaranteed to be valid during a critical section protected by a fast mutex other than the system lock. However, if an address space change would normally be required, the mutex iWaiting flag is set to ensure that the address space change does actually occur when the fast mutex is released. In addition, if the thread has the KThreadAtImplicitSystemLock attribute and the system lock is currently held, the mutex iWaiting flag is also set. This is to ensure that the thread does not exit the mutex-protected critical section while the system lock is held.

The nanokernel scheduler deals with the case where the selected thread is actually blocked on a fast mutex as follows:

All threads blocked on a fast mutex stay on the ready list, so they may be selected during a reschedule. Rather than waste time by switching to the thread and letting it run and immediately switching to the holding thread, this case is checked in the scheduler and the scheduler then goes straight to the mutex holding thread, thus saving a context switch. This check is also what guarantees that the YieldTo function used in NFastMutex wait operations cannot return until the mutex has been released. It is worth noting that it is necessary to check both iWaitFastMutex and iWaitFastMutex->iHoldingThread, since, when the holding thread releases the mutex, iHoldingThread will be set to NULL but iWaitFastMutex will still point to the mutex. There is no need to do any address space changing if the switch to the mutex holding thread is carried out, for the reasons stated in the previous paragraph. There is also no need to set the fast mutex iWaiting flag here since it must already have been set when the selected thread blocked on it.

The present invention is considered to provide the following significant advantages over known operating system kernels:

- By combining mutual exclusion and priority inheritance in a single mechanism, the possibility of priority inheritance being switched off for any reason is removed
- There is no longer any motivation to switch off priority inheritance for performance reasons, since the fast mutex (as its name implies) imposes no performance penalty from combining the priority inheritance and mutual exclusion functionality in a single mechanism.
- The provision of this fast reliable dual purpose mechanism at the microkernel level means that any OS built above it automatically gains the benefits of deadlock avoidance.
- The fast mutex is suitable for both single processor and SMP systems.

Although the present invention has been described with reference to particular embodiments, it will be appreciated that modifications may be effected whilst remaining within the scope of the invention as defined by the appended claims.

The invention claimed is:

1. An apparatus comprising a processor and a memory storing computer program code, wherein the memory and stored computer program code are configured, with the processor, to cause the apparatus to at least:
   implement a scheduler incorporating an algorithm for ordering the running of threads of execution having different priorities, the scheduler maintaining a ready list of threads which are scheduled to run on the device, ordered by priority; and
   implement at least one locking mechanism configured to block access to a resource from all threads except for a thread that holds the locking mechanism,
   wherein the at least one locking mechanism comprises a mutex including a pointer, the pointer included in the mutex pointing to the thread holding the mutex or being null if the mutex is free, the mutex further including a flag indicating whether or not the mutex is contested, and
   wherein in an instance in which the scheduler selects a thread on the ready list to run, but the selected thread is blocked from running because a resource it requires is blocked, the scheduler does not switch to the blocked thread but retains the blocked thread in its place by priority on the ready list and instead yields to the thread which holds the locking mechanism and causes the thread which holds the locking mechanism to run.

2. An apparatus according to claim 1 wherein states are assigned to threads and the ready list comprises of all threads having a common state.

3. An apparatus according to claim 2 wherein a blocked thread is not permitted to change its state.

4. An apparatus according to claim 1 wherein the ready list is subdivided in accordance with the priority of the threads it contains.

5. An apparatus according to claim 1 wherein a thread contains a pointer to any locking mechanism it is blocked on.

6. An apparatus according to claim 1 wherein the memory and stored computer program code are configured, with the processor, to cause the apparatus to implement a plurality of non-nestable locking mechanisms.

7. An apparatus according to claim 1 wherein the memory and stored computer program code are configured, with the processor, to cause the apparatus to call the scheduler at the end of an interrupt service routine which is caused to run.

8. An apparatus according to claim 1 wherein the algorithm is configured to delegate memory management to a replaceable memory model configured in dependence upon a configuration of the apparatus.

9. An apparatus according to claim 8 wherein the memory model is configured to run in either pre-emptible or non-preemptible modes.

10. An apparatus according to claim 9 wherein the mutex is configured to protect the module from running in the pre-emptible mode.

11. An apparatus according to claim 1 wherein the scheduler is included in a kernel of an operating system of the apparatus.

12. An apparatus according to claim 11 wherein the kernel comprises a microkernel or a nanokernel, and wherein the threads are, respectively, microkernel or nanokernel threads.

13. An apparatus according to claim 11 wherein the memory and stored computer program code are configured, with the processor, to cause the apparatus to call the scheduler in response to the kernel being unlocked.

14. An apparatus according to claim 1, wherein the apparatus comprises a mobile computing device.

15. An apparatus according to claim 14, wherein the mobile computing device comprises a smart phone.

16. A method comprising:
   providing a scheduler incorporating an algorithm for ordering the running of threads of execution having different priorities, the scheduler maintaining a ready list of threads which are scheduled to run on a computing device, ordered by priority; and
   providing at least one locking mechanism configured to block access to a resource of the device from all threads except for a thread that holds the locking mechanism,
   wherein the at least one locking mechanism comprises a mutex including a pointer, the pointer included in the mutex pointing to the thread holding the mutex or being null if the mutex is free, the mutex further including a flag indicating whether or not the mutex is contested, and
   wherein in an instance in which the scheduler selects a thread on the ready list to run, but the selected thread is blocked from running because a resource it requires is blocked, the scheduler does not switch to the blocked thread but retains the blocked thread in its place by priority on the ready list and instead yields to the thread that holds the locking mechanism and causes the thread that holds the locking mechanism to run.

17. A method according to claim 16 wherein states are assigned to threads and the list comprises of all threads having a common state.

18. A method according to claim 17, wherein a blocked thread is inhibited from changing its state.

19. A method according to claim 16, further comprising subdividing the ready list in accordance with the priority of the threads it contains.

20. A method according to claim 16 wherein a thread contains a pointer to any locking mechanism it is blocked on.

21. A method according to claim 16 comprising providing a plurality of non-nestable locking mechanisms.

22. A method according to claim 16 wherein the scheduler is called at the end of an interrupt service routine which is caused to run on the computing device.

23. A method according to claim 16 wherein the algorithm is configured to delegate memory management to a replaceable memory model configured in dependence upon a configuration of the computing device.

24. A method according to claim 23 wherein the memory model is configured to run in either pre-emptible or non-preemptible modes.

25. A method according to claim 24 wherein the mutex is configured to protect the module from running in the pre-emptible mode.

26. A method according to claim 16 wherein the scheduler is included in a kernel.

27. A method according to claim 26 wherein the kernel comprises a microkernel or a nanokernel and wherein the threads are, respectively, microkernel or nanokernel threads.

28. A method according to claim 26 wherein the scheduler is called in response to the kernel being unlocked.

29. A non-transitory computer-readable storage medium storing computer program code for an operating system for a computing device, the operating system comprising:

a scheduler incorporating an algorithm for ordering the running of threads of execution having different priorities, the scheduler configured to maintain a ready list of threads which are scheduled to run on the device, ordered by priority; and at least one locking mechanism configured to block access to a resource of the device from all threads except for a thread that holds the locking mechanism, wherein the at least one locking mechanism comprises a mutex including a pointer, the pointer included in the mutex pointing to the thread holding the mutex or being null if the mutex is free, the mutex further including a flag indicating whether or not the mutex is contested, and wherein in an instance in which the scheduler selects a thread on the ready list to run, but the selected thread is blocked from running because a resource it requires is blocked, the scheduler is configured to not switch to the blocked thread but retain the blocked thread in its place by priority on the ready list and instead yield to the thread that holds the locking mechanism and cause the thread that holds the locking mechanism to run.

* * * * *

UNITED STATES PATENT AND TRADEMARK OFFICE
CERTIFICATE OF CORRECTION

PATENT NO. : 8,161,481 B2
APPLICATION NO. : 10/599574
DATED : April 17, 2012
INVENTOR(S) : May Page 1 of 1

It is certified that error appears in the above-identified patent and that said Letters Patent is hereby corrected as shown below:

<u>Column 5,</u>
Line 3, "optimising" should read --optimizing--.

<u>Column 8,</u>
Line 4, "yieldingto" should read --yielding to--.

Signed and Sealed this
Fifth Day of February, 2013

Teresa Stanek Rea
*Acting Director of the United States Patent and Trademark Office*